United States Patent
Kim et al.

(10) Patent No.: US 10,384,149 B2
(45) Date of Patent: Aug. 20, 2019

(54) CYCLONE TYPE LIQUID-VAPOR SEPARATOR AND FORCED CIRCULATION TYPE EVAPORATOR USING THE SAME

(71) Applicant: DOOSAN HEAVY INDUSTRIES & CONSTRUCTION CO., LTD., Changwon, Gyeongsangnam-do (KR)

(72) Inventors: Sangmoon Kim, Seoul (KR); Gunmyung Lee, Daegu (KR); Weekwan Kang, Seoul (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 314 days.

(21) Appl. No.: 15/271,724

(22) Filed: Sep. 21, 2016

(65) Prior Publication Data

US 2017/0095753 A1 Apr. 6, 2017

(30) Foreign Application Priority Data

Oct. 6, 2015 (KR) .................. 10-2015-0140309

(51) Int. Cl.
  *B01D 1/22* (2006.01)
  *B01D 9/00* (2006.01)
  (Continued)

(52) U.S. Cl.
  CPC ............. *B01D 9/0022* (2013.01); *B01D 1/22* (2013.01); *B01D 19/0021* (2013.01);
  (Continued)

(58) Field of Classification Search
  CPC ...... C02F 1/04–1/12; C02F 9/00; B01D 1/06; B01D 1/065; B01D 1/28; B01D 1/305;
  (Continued)

(56) References Cited

U.S. PATENT DOCUMENTS 1,600,762 A * 9/1926 Hawley .................. B04C 1/00
  110/119
2,310,649 A * 2/1943 Peebles .................. B01D 1/12
  159/27.1
(Continued)

FOREIGN PATENT DOCUMENTS

CH 281743 A 3/1952
EP 1 125 620 A2 8/2001
(Continued)

OTHER PUBLICATIONS

Office Action of Corresponding Korean Application No. 10-2015-0140309 dated Jul. 14, 2016.
(Continued)

*Primary Examiner* — Jonathan Miller
(74) *Attorney, Agent, or Firm* — Invenstone Patent, LLC (57) ABSTRACT

A cyclone type liquid-vapor separator includes a chamber including: an internal space wherein the treatment liquid introduced into the internal space is depressurized and evaporated; a vapor outlet formed on a top of the chamber and through which vapors generated through the evaporation is discharged; and a concentrated liquid outlet formed on a bottom of the chamber and through which the concentrated treatment liquid is discharged; an inlet part coupled to a side surface of the chamber in a tangent line direction of an inner peripheral surface of the chamber, the treatment liquid introduced into the chamber is turned in the form of vortexes along the inner peripheral surface of the chamber; and at least one partition wall disposed in an area between the inlet part and the vapor outlet of the internal space of the chamber and protruding from the inner peripheral wall of the chamber to prevent mist contained in the vapors from moving upwardly.

18 Claims, 7 Drawing Sheets

(51) Int. Cl.
*B01D 19/00* (2006.01)
*B04C 5/04* (2006.01)
*B04C 5/103* (2006.01)
*B04C 5/10* (2006.01)
*B04C 5/14* (2006.01)
*B04C 5/20* (2006.01)
*B04C 9/00* (2006.01)
*B04C 5/181* (2006.01)

(52) U.S. Cl.
CPC ............ *B01D 19/0057* (2013.01); *B04C 5/04* (2013.01); *B04C 5/10* (2013.01); *B04C 5/103* (2013.01); *B04C 5/14* (2013.01); *B04C 5/181* (2013.01); *B04C 5/20* (2013.01); *B04C 9/00* (2013.01); *B04C 2009/002* (2013.01); *B04C 2009/004* (2013.01); *B04C 2009/005* (2013.01)

(58) Field of Classification Search
CPC .. B04C 5/04; B04C 5/10; B04C 5/103; B04C 5/14; B04C 5/181; B04C 5/20
See application file for complete search history.

(56) References Cited

U.S. PATENT DOCUMENTS

| | | | | |
|---|---|---|---|---|
| 3,753,336 A * | 8/1973 | Drew | ............. | B01D 45/12 209/722 |
| 4,018,656 A * | 4/1977 | Rogers | ............. | B01D 3/065 159/2.3 |
| 4,054,493 A * | 10/1977 | Roller | ............. | B01D 1/285 159/16.3 |
| 4,247,371 A * | 1/1981 | Roller | ............. | B01D 1/2846 159/24.3 |
| 4,375,386 A * | 3/1983 | Windham | ............. | B01D 1/305 159/31 |
| 6,551,466 B1 * | 4/2003 | Kresnyak | ............. | B01D 1/0047 159/24.1 |
| 7,077,201 B2 * | 7/2006 | Heins | ............. | C02F 1/04 166/266 |
| 7,150,320 B2 * | 12/2006 | Heins | ............. | E21B 43/2406 166/266 |
| 7,428,926 B2 * | 9/2008 | Heins | ............. | C02F 1/04 166/266 |
| 7,438,129 B2 * | 10/2008 | Heins | ............. | C02F 1/04 166/266 |
| 7,540,936 B2 * | 6/2009 | Lilleystone | ............. | B01D 17/04 159/43.1 |
| 7,681,643 B2 * | 3/2010 | Heins | ............. | E21B 43/24 159/24.1 |
| 8,043,419 B2 * | 10/2011 | Folkvang | ............. | B01D 17/00 210/512.1 |
| 8,366,802 B2 * | 2/2013 | Olsson | ............. | B01D 19/0026 95/1 |
| 8,741,100 B2 * | 6/2014 | Duesel, Jr. | ............. | B01D 1/14 159/4.01 |
| 8,741,101 B2 * | 6/2014 | Duesel, Jr. | ............. | B01D 1/18 159/4.01 |
| 8,951,392 B2 * | 2/2015 | James | ............. | B01D 1/065 159/13.2 |
| 9,085,471 B2 * | 7/2015 | Mandigo | ............. | C02F 1/041 |
| 9,233,320 B2 * | 1/2016 | Moen | ............. | B01D 19/0021 |
| 9,499,413 B2 * | 11/2016 | Schmidt | ............. | B01D 1/0082 |
| 10,046,249 B2 * | 8/2018 | Zimmer | ............. | B01D 1/065 |
| 2002/0088703 A1 * | 7/2002 | Walker | ............. | B01D 1/0094 203/10 |
| 2011/0203914 A1 | 8/2011 | Gruson | | |

FOREIGN PATENT DOCUMENTS

| | | |
|---|---|---|
| GB | 2 485 251 A | 5/2012 |
| JP | 2001-198490 A | 7/2001 |
| JP | 2008-168183 A | 7/2008 |
| KR | 10-2002-0059467 A | 7/2002 |
| KR | 10-2006-0109619 A | 10/2006 |
| KR | 10-2007-0076352 A | 7/2007 |
| KR | 10-2014-0056813 A | 5/2014 |
| WO | 2004/030793 A1 | 4/2004 |

OTHER PUBLICATIONS

PCT Search Report dated Dec. 2, 2016 of Corresponding PCT Application No. PCT/KR2016/009475.
European Search Report dated Feb. 20, 2017 of corresponding European Application No. 16192672.0.

* cited by examiner

CYCLONE TYPE LIQUID-VAPOR SEPARATOR AND FORCED CIRCULATION TYPE EVAPORATOR USING THE SAME

CROSS-REFERENCE TO RELATED APPLICATION

This application claims benefit of priority to Korean Patent Application No. 10-2015-0140309 filed on Oct. 6, 2015 in the Korean Intellectual Property Office, the disclosure of which is incorporated herein by reference in its entirety.

BACKGROUND

Field

Apparatuses consistent with exemplary embodiments relate to a cyclone type liquid-vapor separator and a forced circulation type evaporator using the same, and more particularly, to a cyclone type liquid-vapor separator that is coupled to a heat exchanger to constitute a forced circulation type evaporator, thereby replacing a conventional liquid-vapor separator in which a reflection plate or a diffusion nozzle is disposed to ensure flashing area therewith.

Background of the Related Art

A forced circulation type evaporator is generally used as a crystallizer in sewage and wastewater treatment facilities, seawater desalination facilities, zero liquid discharge ZLD facilities, and facilities for concentrating food like sugar, salt, fruit liquids and so on.

The forced circulation type evaporator includes a heat exchanger for heating treatment liquid through a heat medium and a liquid-vapor separator for injecting the heated treatment liquid into a chamber, evaporating the treatment liquid, and separating the evaporated treatment liquid into vapors and concentrated liquid, and the concentrated liquid discharged from the liquid-vapor separator is recycled to the heat exchanger through a pump.

Figure 1A:
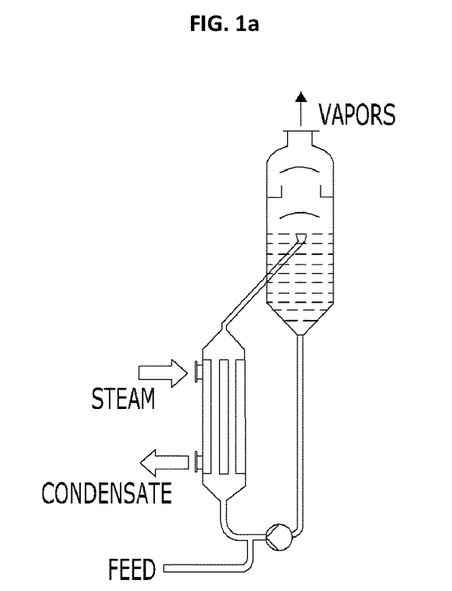
FIGS. 1a and 1b are schematic views showing two kinds of forced circulation type evaporators of the related art.
Figure 1B:
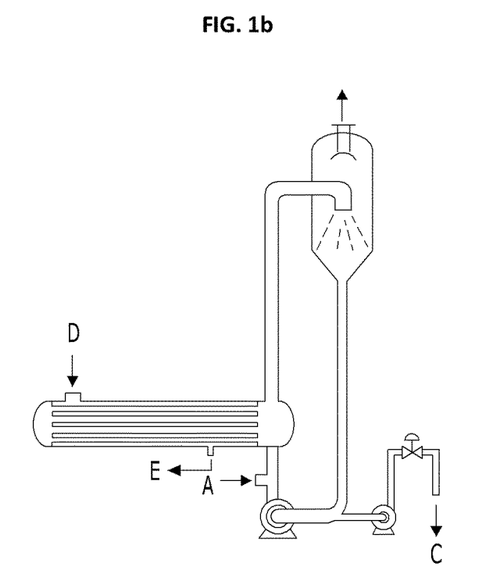

As shown in FIGS. 1a and 1b, the liquid-vapor separator of the related art used in the forced circulation type evaporator has a reflection plate (which is shown in FIG. 1a) or a diffusion nozzle (which is shown in FIG. 1b) disposed in a chamber so as to ensure the flashing area in the chamber.

In the process where the treatment liquid is injected through the spray nozzle in the liquid-vapor separator of the related art, however, foams are produced and mixed with the separated vapors, thereby giving bad influences on next stage. Further, caking is caused so that crystals of solid substances are produced from the concentrated liquid discharged to the lower portion of the liquid-vapor separator of the related art, thereby undesirably reducing the efficiencies in the removal of the solid substances in a dewatering process on the next stage.

Accordingly, there is a need for the development of a new liquid-vapor separator capable of ensuring a flashing area over a given level, while not adopting the spray nozzle injection of the related art, so that no foams are produced, thereby enhancing the efficiency of evaporation, and further capable of forming round and uniform crystals, thereby improving the efficiencies in the removal of solid substances on next stage thereof.

SUMMARY

Accordingly, the exemplary embodiment has been made in view of the above-mentioned problems occurring in the prior art, and it is an object of the present disclosure to provide a cyclone type liquid-vapor separator and a forced circulation type evaporator using the same that is capable of ensuring a flashing area over a given level, while not adopting a spray nozzle injection, so that no foams are produced, thereby enhancing the efficiency of evaporation, and further capable of forming round and uniform crystals, thereby improving the efficiencies in the removal of solid substances on next stage thereof.

To accomplish the above-mentioned object, according to a first aspect of an exemplary embodiment, there is provided a cyclone type liquid-vapor separator for separating vapors from treatment liquid introduced thereinto, discharging the separated vapors to the upper portion thereof, and discharging concentrated treatment liquid to the lower portion thereof, the liquid-vapor separator 100 including: a chamber 110 having an internal space formed therein so that the treatment liquid introduced thereinto is depressurized and evaporated to allow the vapors generated through the evaporation to be discharged through a vapor outlet 111 formed on the top thereof and to allow the concentrated treatment liquid to be discharged through a concentrated liquid outlet 112 formed on the bottom thereof; an inlet part 120 coupled to the side surface of the chamber 110 in a tangent line direction of the inner peripheral surface of the chamber 110 so as to inject the treatment liquid introduced thereinto, so that the treatment liquid is turned in the form of vortexes along the inner peripheral surface of the chamber 110; and at least one or more partition walls 130 disposed in an area between the inlet part 120 and the vapor outlet 111 of the internal space of the chamber 110 in such a manner as to protrude from the inner peripheral wall of the chamber to prevent the mist contained in the vapors produced from moving upwardly.

According to the exemplary embodiment, desirably, the partition walls 130 inclinedly protrude upwardly from the inner peripheral surface of the chamber 110 at an angle of 90 to 180°.

According to the exemplary embodiment, desirably, the inlet part 120 has a guide part 121 disposed extendedly by a given section along the inner peripheral surface of the chamber 110 from the connected portion to the side surface of the chamber 110 so as to guide the rotation of the treatment liquid introduced therethrough.

According to the exemplary embodiment, desirably, the guide part 121 is a separate member protruding from the inner peripheral surface of the chamber 110.

According to the exemplary embodiment, desirably, the guide part 121 is formed by passing the pipe of the inlet part 120 through the chamber 110, extendedly inserting the pipe of the inlet part 120 into the chamber 110, and fastening the pipe of the inlet part 120 to the inner peripheral surface of the chamber 110 along the inner peripheral surface of the chamber 110.

According to the exemplary embodiment, desirably, the pipe of the inlet part 120, which is passed through the chamber 110 and extendedly inserted into the chamber 110 to form the guide part 121, is open on a given area of the top portion thereof.

According to the exemplary embodiment, desirably, the liquid-vapor separator 100 further includes an interior demister 140a disposed on any one or more areas above or under the partition walls 130 in the chamber 110 and having a mesh type plate member adapted to block the mist contained in the vapors in the process wherein the generated vapors are discharged upwardly.

According to the exemplary embodiment, desirably, the liquid-vapor separator further includes an exterior demister 140b disposed separately to the outside of the chamber 110 in such a manner as to be connected to the end of the vapor outlet 111 to introduce the discharged vapors from the vapor outlet thereinto and having a chevron type member disposed in a moving path of the introduced vapors to block the mist contained in the vapors.

According to the exemplary embodiment, desirably, the inner peripheral wall of the chamber 110 is tapered toward the concentrated liquid outlet 112 formed on the bottom of the chamber 110 to reduce the turning radius of the treatment liquid.

According to the exemplary embodiment, desirably, the liquid-vapor separator 100 further includes vortex breaking members 150 disposed on an area wherein the concentrated liquid outlet 112 is formed on the bottom of the chamber 110 so as to break the vortexes generated from the treatment liquid.

According to the exemplary embodiment, desirably, the vortex breaking members 150 are at least two or more plate members crossing each other in such a manner as to be parallel to the discharge direction of the concentrated treatment liquid.

To accomplish the above-mentioned objects, according to a second aspect of the exemplary embodiment, there is provided a forced circulation type evaporator A for evaporating and concentrating treatment liquid, including: a heat exchanger 200 adapted to heat the treatment liquid introduced thereinto by means of heat exchange with a heat medium introduced from the outside thereof; and a liquid-vapor separator 100 for separating vapors from the heated treatment liquid introduced from the heat exchanger 200, discharging the separated vapors to the upper portion thereof, and discharging concentrated treatment liquid to the lower portion thereof, wherein the liquid-vapor separator 100 includes: a chamber 110 having an internal space formed therein so that the treatment liquid introduced thereinto is depressurized and evaporated to allow the vapors generated through the evaporation to be discharged through a vapor outlet 111 formed on the top thereof and to allow the concentrated treatment liquid to be discharged through a concentrated liquid outlet 112 formed on the bottom thereof; an inlet part 120 coupled to the side surface of the chamber 110 in a tangent line direction of the inner peripheral surface of the chamber 110 so as to inject the treatment liquid introduced thereinto, so that the treatment liquid is turned in the form of vortexes along the inner peripheral surface of the chamber 110; and at least one or more partition walls 130 disposed in an area between the inlet part 120 and the vapor outlet 111 of the internal space of the chamber 110 in such a manner as to protrude from the inner peripheral wall of the chamber 110 to prevent the mist contained in the vapors produced from moving upwardly.

According to the exemplary embodiment, desirably, the forced circulation type evaporator further includes a suction pump 300 connected to the rear end of the liquid-vapor separator 100 to provide power for discharging the concentrated treatment liquid from the liquid-vapor separator 100.

According to the exemplary embodiment, desirably, the partition walls 130 inclinedly protrude upwardly from the inner peripheral surface of the chamber 110 at an angle of 90 to 180°.

According to the exemplary embodiment, desirably, the inlet part 120 has a guide part 121 disposed extendedly by a given section along the inner peripheral surface of the chamber 110 from the connected portion to the side surface of the chamber 110 so as to guide the rotation of the treatment liquid introduced therethrough, the guide part 121 being a separate member protruding from the inner peripheral surface of the chamber 110 or being formed by passing the pipe of the inlet part 120 through the chamber 110, extendedly inserting the pipe of the inlet part 120 into the chamber 110, and fastening the pipe of the inlet part 120 to the inner peripheral surface of the chamber 110 along the inner peripheral surface of the chamber 110, wherein the pipe of the inlet part 120, which is passed through the chamber 110 and extendedly inserted into the chamber 110 to form the guide part 121, is open on a given area of the top portion thereof.

According to the exemplary embodiment, desirably, the forced circulation type evaporator further includes an interior demister 140a disposed on any one or more areas above or under the partition walls 130 in the chamber 110 and having a mesh type plate member adapted to block the mist contained in the vapors in the process wherein the generated vapors are discharged upwardly, or an exterior demister 140b disposed separately to the outside of the chamber 110 in such a manner as to be connected to the end of the vapor outlet 111 to introduce the discharged vapors from the vapor outlet thereinto and having a chevron type member disposed in a moving path of the introduced vapors to block the mist contained in the vapors.

According to an aspect of an exemplary embodiment, there is provided a cyclone type liquid-vapor separator for separating vapors from treatment liquid introduced thereinto, discharging the separated vapors to the upper portion thereof, and discharging concentrated treatment liquid to the lower portion thereof, the liquid-vapor separator including: a chamber including: an internal space wherein the treatment liquid introduced into the internal space is depressurized and evaporated; a vapor outlet formed on a top of the chamber and through which vapors generated through the evaporation is discharged; and a concentrated liquid outlet formed on a bottom of the chamber and through which the concentrated treatment liquid is discharged; an inlet part coupled to a side surface of the chamber in a tangent line direction of an inner peripheral surface of the chamber, the treatment liquid introduced into the chamber is turned in the form of vortexes along the inner peripheral surface of the chamber; and at least one partition wall disposed in an area between the inlet part and the vapor outlet of the internal space of the chamber and protruding from the inner peripheral wall of the chamber to prevent mist contained in the vapors from moving upwardly.

The at least one partition wall may inclinedly protrude upwardly from the inner peripheral surface of the chamber at an angle of 90 to 180°.

The inlet part may include a guide part disposed extendedly by a section along the inner peripheral surface of the chamber from a connected portion to the side surface of the chamber and configured to guide a rotation of the treatment liquid introduced through the inlet part.

The guide part may be separate from the inlet part and protrude from the inner peripheral surface of the chamber.

The guide part may include a pipe passing through the inlet part, the pipe extendedly inserted into the chamber, and being fastened to the inner peripheral surface of the chamber along the inner peripheral surface of the chamber.

The pipe of the inlet part, which is passed through the chamber and extendedly inserted into the chamber, may be open on a top portion of the pipe.

The liquid-vapor separator may further include an interior demister disposed above or under the at least one partition wall in the chamber and having a mesh type plate member configured to block the mist contained in the vapors discharged upwardly.

The liquid-vapor separator may further include an exterior demister disposed separately to an exterior of the chamber in such a manner as to be connected to an end of the vapor outlet to introduce the discharged vapors from the vapor outlet thereinto and having a chevron type member disposed in a moving path of the introduced vapors to block the mist contained in the vapors.

The inner peripheral wall of the chamber may be tapered toward the concentrated liquid outlet formed on the bottom of the chamber to reduce a turning radius of the treatment liquid.

The liquid-vapor separator may further include a vortex breaking member disposed on an area wherein the concentrated liquid outlet is formed on the bottom of the chamber so as to break the vortexes generated from the treatment liquid.

The vortex breaking member may include at least two plate members crossing each other in such a manner as to be parallel to a discharge direction of the concentrated treatment liquid.

According to an aspect of an exemplary embodiment, there is provided a forced circulation type evaporator for evaporating and concentrating treatment liquid, including: a heat exchanger configured to heat the treatment liquid introduced into the heat exchanger by a heat medium introduced from an exterior of the heat exchanger; and a liquid-vapor separator configured to separate vapors from the heated treatment liquid from the heat exchanger, configured to discharge the separated vapors to an upper portion of the liquid-vapor separator, and configured to discharge concentrated treatment liquid to a lower portion of the liquid-vapor separator, wherein the liquid-vapor separator includes: a chamber including: an internal space wherein the treatment liquid introduced into the internal space is depressurized and evaporated; a vapor outlet formed on a top of the chamber and through which vapors generated through the evaporation is discharged; and a concentrated liquid outlet formed on a bottom of the chamber and through which the concentrated treatment liquid is discharged; an inlet part coupled to a side surface of the chamber in a tangent line direction of an inner peripheral surface of the chamber, the treatment liquid introduced into the chamber is turned in the form of vortexes along the inner peripheral surface of the chamber; and at least one partition wall disposed in an area between the inlet part and the vapor outlet of the internal space of the chamber and protruding from the inner peripheral wall of the chamber to prevent mist contained in the vapors from moving upward.

The forced circulation type evaporator may further include a suction pump connected to a rear end of the liquid-vapor separator and configured to provide power for discharging the concentrated treatment liquid from the liquid-vapor separator.

The at least one partition wall may inclinedly protrude upwardly from the inner peripheral surface of the chamber at an angle of 90 to 180°.

The inlet part may include a guide part disposed extendedly by a section along the inner peripheral surface of the chamber from a connected portion to the side surface of the chamber and configured to guide a rotation of the treatment liquid introduced through the inlet part.

The guide part may be separate from the inlet part and protrudes from the inner peripheral surface of the chamber.

The guide part may include a pipe passing through the inlet part, the pipe extendedly inserted into the chamber, and being fastened to the inner peripheral surface of the chamber along the inner peripheral surface of the chamber.

The pipe of the inlet part, which is passed through the chamber and extendedly inserted into the chamber, may be open on a top portion of the pipes.

The forced circulation type evaporator may further include an interior demister disposed above or under the at least one partition wall in the chamber and having a mesh type plate member configured to block the mist contained in the vapors discharged upwardly.

The forced circulation type evaporator may further include an exterior demister disposed separately to an exterior of the chamber in such a manner as to be connected to an end of the vapor outlet to introduce the discharged vapors from the vapor outlet thereinto and having a chevron type member disposed in a moving path of the introduced vapors to block the mist contained in the vapors.

BRIEF DESCRIPTION OF THE DRAWINGS

The above and other objects, features and advantages of the exemplary embodiment will be apparent from the following detailed description of the exemplary embodiments of the disclosure in conjunction with the accompanying drawings, in which.

DETAILED DESCRIPTION

Hereinafter, an explanation on a liquid-vapor separator and a forced circulation type evaporator having the liquid-vapor separator according to the exemplary embodiment will be in detail given with reference to the attached drawing. Before the description, the terms or terminology used in the description and claims of the exemplary embodiment are used to only describe specific exemplary embodiments and are not intended to restrict the exemplary embodiment.

In the description, when it is said that one member is located "above" or "under" another member, it means that one member may come into contact with another member as well as yet another member may exist between the two members.

In the description, when it is said that one portion is described as "includes" any component, one element further may include other components unless no specific description is suggested.

Identification symbols on steps are used for the convenience of the description, and they do not mean the order of the steps. The steps may be differently carried out from the described order unless a specific order is described. That is, the steps may be carried out in the same order as described, carried out at the same time, or carried out in the opposite order to that described.

In the description, a "front end" of a given member means all directions to which a given gas or fluid is introduced into the given member, and in the same manner as above, a 'rear end" of a given member means all directions to which a given gas or fluid is discharged from the given member, The exemplary embodiment is disclosed with reference to the attached drawings wherein the corresponding parts in the exemplary embodiments are indicated by corresponding reference numerals and the repeated explanation on the corresponding parts will be avoided. If it is determined that the detailed explanation on the well-known technology related to the inventive concept makes the scope of the present invention not clear, the explanation will be avoided for the brevity of the description.

In the description of the components of the exemplary embodiment, further, terms, such as the first, the second, A, B, (a), (b) and so on may be used to describe various elements, but the elements should not be restricted by the terms. The terms are used to only distinguish one element from the other element. Accordingly, the inherence, sequence or order of the corresponding element is not restricted by the terms.

When it is said that one element is described as being "connected" or "coupled" to another element, one element may be directly connected or coupled to another element, but it should be understood that yet another element may be "connected" or "coupled" between the two elements.

In the description, when it is said that one element is located "above" another element, it should be understood that one element is located in such a manner as to pass through another element, and otherwise, another member is located in such a manner as to pass through one element.

Figure 2:
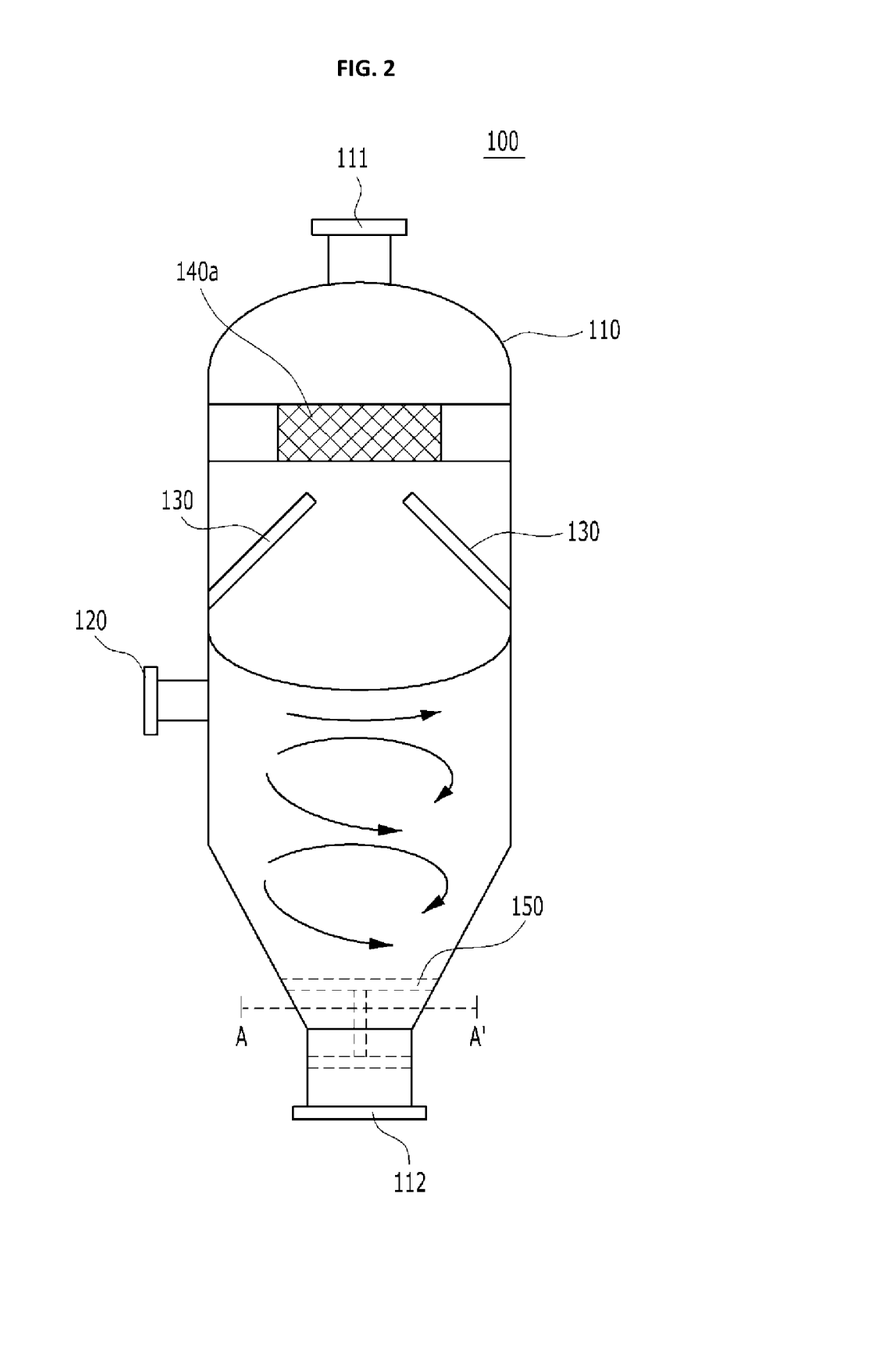
FIG. 2 is a schematic view showing a liquid-vapor separator according to the exemplary embodiment, in which an interior demister is mounted.

The present disclosure relates to a liquid-vapor separator that separates vapors from treatment liquid to discharge the separated vapors upwardly and discharge concentrated treatment liquid downwardly, and FIG. 2 is a schematic view showing a liquid-vapor separator according to the exemplary embodiment.

A liquid-vapor separator 100 according to the exemplary embodiment includes a chamber 110 having a vapor outlet 111 formed on the top thereof and a concentrated liquid outlet 112 formed on the bottom thereof, an inlet part 120 connected to the chamber 110 to introduce treatment liquid thereinto, and at least one or more partition walls 130 disposed in the chamber 110 to prevent the mist contained in the vapors produced in the depressurization and evaporation process of the treatment liquid from moving upwardly and introduced into next stage.

Particularly, the liquid-vapor separator 100 according to the exemplary embodiment is not a conventional type device using a spray nozzle, but a cyclone type device configured to have the inlet part 120 coupled to the side surface of the chamber 110 in a tangent line direction of the inner peripheral surface of the chamber 110, so that the treatment liquid forms vortexes along the inner peripheral surface of the chamber 110 by means of the inlet part 120.

Accordingly, as shown in FIG. 2, the treatment water rotates in the form of vortexes in the chamber 110, and depressurization and evaporation occur from the surfaces of the vortexes. Further, the efficiency of evaporation is enhanced by the increment of turbulent flow strength and flashing area, and hydrostatic pressure is lowered as it goes toward the center of the vortexes, thereby minimizing submersible loss. Also, round and uniform crystals are formed through the mixing effects generated by the turbulent flows in the form of vortexes, thereby improving the efficiency in the removal of solid substances on next stage, that is, in a dewatering process. Furthermore, a section in which the liquid stays does not exist in the chamber 110, thereby preventing the generation of caking.

As shown in FIG. 2, the liquid-vapor separator 100 according to the exemplary embodiment includes the at least one or more partition walls 130 adapted to prevent the mist contained in the vapors produced in the chamber 110 from moving upwardly. In the vapor producing and raising process, large and small mist (droplets) may move upwardly together with the vapors, and in this case, relatively large mist is blocked by means of the partition walls 130 and falls down by means of gravity.

The partition walls 130 are disposed in an internal space of the chamber 110 between the inlet part 120 and the vapor outlet 111 in such a manner as to protrude from the inner peripheral surface of the chamber 110. More particularly, as shown in FIG. 2, the partition walls 130 inclinedly protrude upwardly from the inner peripheral surface of the chamber 110 at an angle of 90 to 180°, thereby more effectively blocking the upward movement of the mist and inducing downward movement of the blocked mist.

On the other hand, relatively small mist may be not blocked by means of the partition walls 130 and thus move upwardly, and so as to avoid the problems, the liquid-vapor separator 100 according to the exemplary embodiment further includes a demister. According to the exemplary embodiment, as shown in FIG. 2, the liquid-vapor separator 100 has an interior demister 140a disposed therein. In more detail, the interior demister 140a is disposed on any one or more areas above or under the partition walls 130 in the chamber 110 and has a mesh type plate member adapted to block the mist contained in the vapors in the process wherein the generated vapors are discharged upwardly. Through the formation of the interior demister 140a, the mist not removed through the partition walls 130 is effectively filtered in the upward movement process of the vapors.

Figure 6:
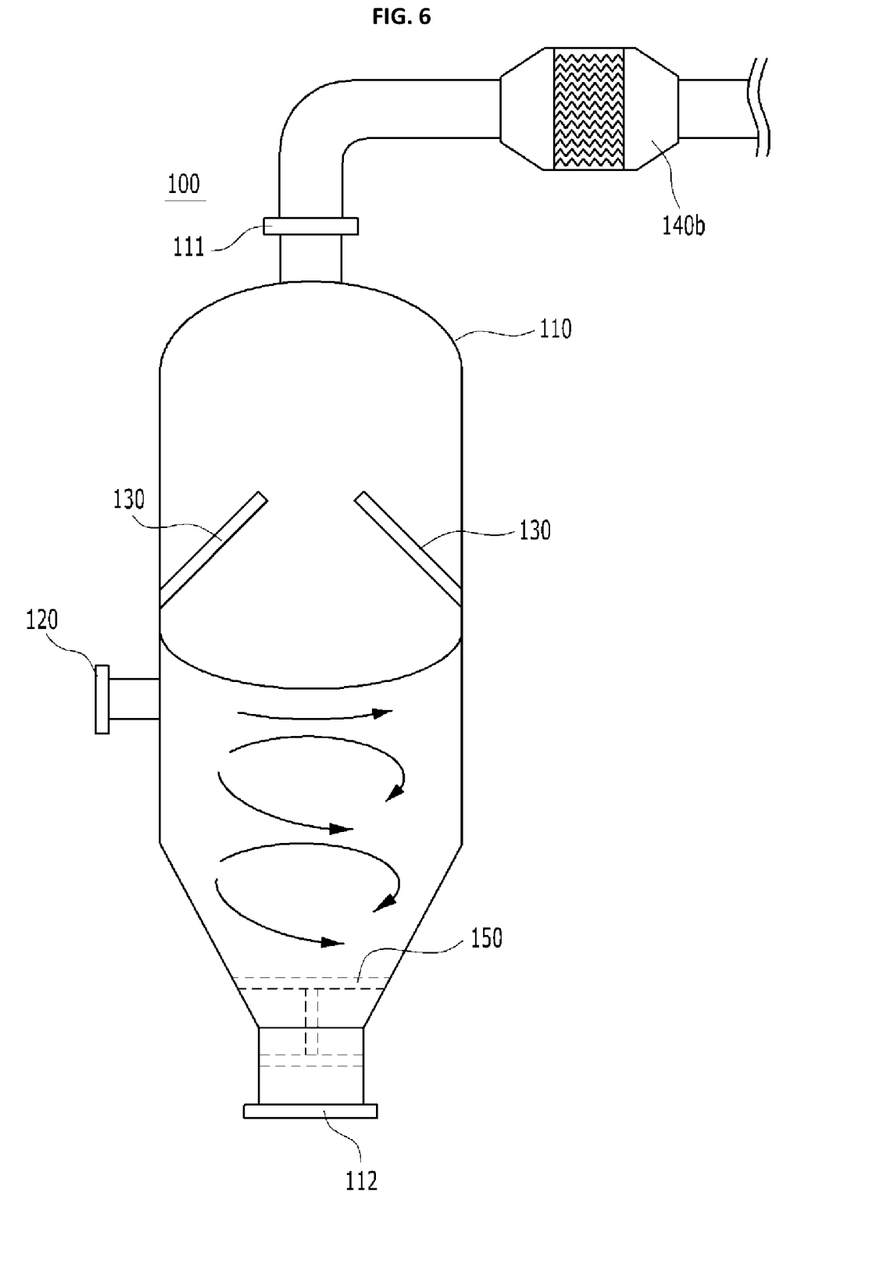
FIG. 6 is a schematic view showing the liquid-vapor separator according to the exemplary embodiment, in which an exterior demister is mounted.

As shown in FIG. 6, the liquid-vapor separator 100 according to the exemplary embodiment may include an exterior demister 140b. In more detail, the exterior demister 140b is disposed separately to the outside of the chamber 110 in such a manner as to be connected to the end of the vapor outlet 111 to introduce the discharged vapors from the vapor outlet 111 thereinto and has a chevron type member disposed in a moving path of the introduced vapors to block the mist contained in the vapor. If the exterior demister 140b is located at the outside of the chamber 11, the volume of the chamber 111 of the liquid-vapor separator 100 using relatively high quality and high cost materials can be reduced economically, and further, the contamination of the demister is minimized, thereby making it easy to perform maintenance like cleaning.

The liquid-vapor separator 100 according to the exemplary embodiment further includes a guide part 121 disposed within the chamber 110 to guide the rotation of the treatment liquid so that the vortexes in the chamber 110 are formed in uniform heights to provide sufficient evaporation efficiencies.

If the treatment liquid is introduced from the inlet part 120 in the tangent line direction of the inner peripheral surface of the chamber 110 into the chamber 110, without having the guide part 121, the water surface on the opposite area to the area adjacent to the inlet part 120 becomes lower than that on the area adjacent to the inlet part 120 through the influence of gravity and the reduction of the pressure of the introduced treatment liquid, and accordingly, unbalancing on the water surfaces is caused to have a bad influence on the evaporation efficiency.

So as to remove the above-mentioned problems, accordingly, the guide part 121 is disposed extendedly by a given section along the inner peripheral surface of the chamber 110 in the rotating direction of the treatment liquid from the connected portion between the inlet part 120 and the side surface of the chamber 110, so that the treatment liquid supplied from the inlet part 120 can maintain the introduced pressure to a given level, without having no influence under gravity for the given section.

Figure 3A:
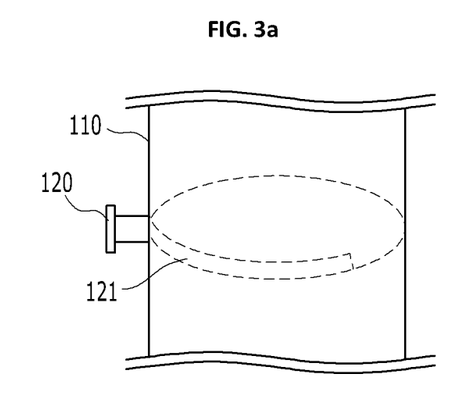
FIGS. 3a and 3b are front and plan views showing the liquid-vapor separator according to the exemplary embodiment, wherein an example of the coupling of an inlet part and a guide part to a chamber.
Figure 3B:
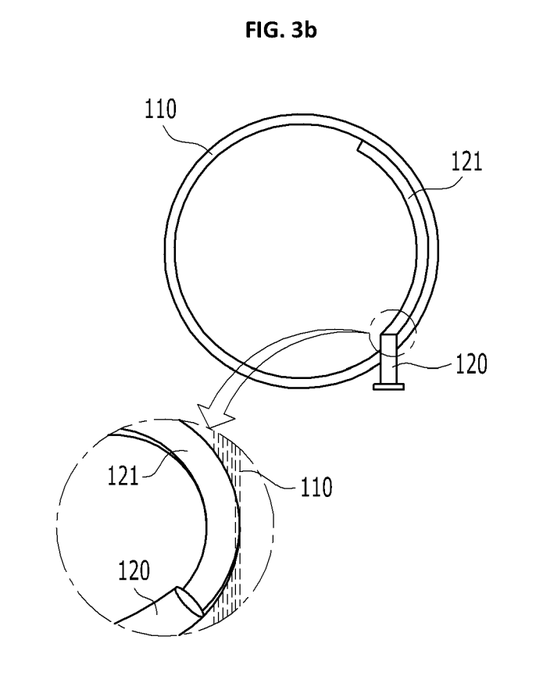

As shown in FIGS. 3a and 3b, the guide part 121 is a separate member protruding from the inner peripheral surface of the chamber 110. Referring to FIG. 3b, the treatment liquid supplied from the inlet part 120 flows along the guide part 121 protruding by the given section from the inner peripheral surface of the chamber 110, thereby causing the entirely uniform vortexes therefrom.

Figure 4A:
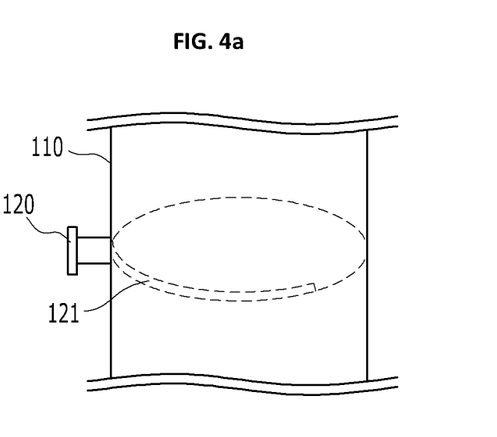
FIGS. 4a and 4b are front and plan views showing the liquid-vapor separator according to the exemplary embodiment, wherein another example of the coupling of an inlet part and a guide part to a chamber.
Figure 4B:
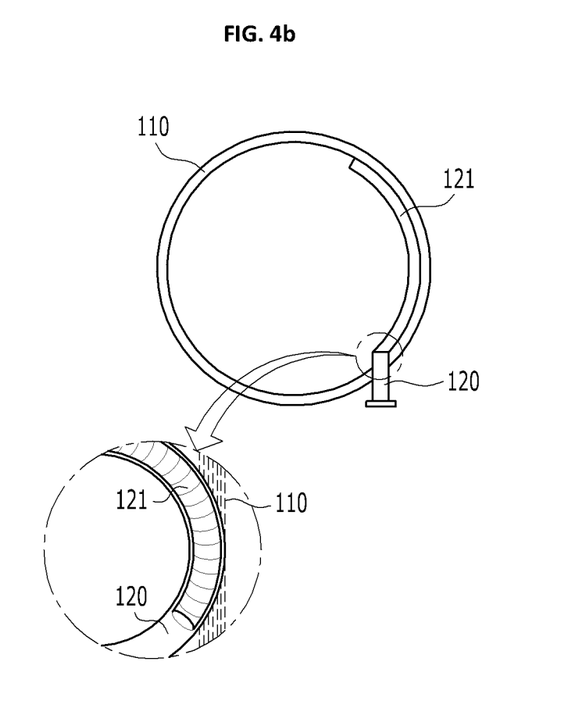

On the other hand, as shown in FIGS. 4a and 4b, the guide part 121 is formed by extending the pipe constituting the inlet part 120 by the given section. In more detail, the pipe of the inlet part 120 is passed through the chamber 110, extendedly inserted into the chamber 110, and fastened to the inner peripheral surface of the chamber 110 along the inner peripheral surface of the chamber 110. So as to allow the evaporation to be carried out even in the extendedly inserted area of the inlet part 120, at this time, the pipe of the inlet part 120, which is extendedly inserted into the chamber 110 to form the guide part 121, as shown in FIGS. 4a and 4b, is desirably open on a given area of the top portion thereof.

As shown in FIG. 2, the inner peripheral wall of the chamber 110 of the liquid-vapor separator 100 according to the exemplary embodiment is desirably tapered toward the concentrated liquid outlet 112 formed on the bottom thereof to reduce the turning radius of the treatment liquid. Under the lower portion structure of the chamber 110 wherein the sectional area thereof is gradually reduced, at this time, when the treatment liquid reaches the concentrated liquid outlet 112, drastic vortexes are generated to cause cavitation thereon, which gives bad influence on a pump connected to the rear end of the chamber 110 to provide the power for discharging the concentrated treatment liquid from the chamber 110.

Figure 5:
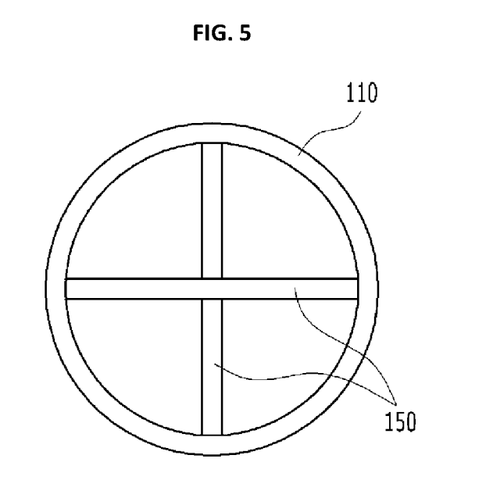
FIG. 5 is a sectional view taken along the line A-A' of FIG. 2.

So as to remove the above-mentioned problems, the liquid-vapor separator 100 according to the exemplary embodiment further includes vortex breaking members 150 disposed on the area wherein the concentrated liquid outlet 112 is formed on the lower portion of the chamber 110 so as to break the vortexes generated from the treatment liquid. The vortex breaking members 150 are located on the path of the discharged treatment liquid and block the vortex flows of the treatment liquid, thereby breaking the vortexes formed therein. FIG. 5 is a sectional view taken along the line A-A' of FIG. 2, and as shown in FIG. 5, the vortex breaking members 150 are at least two or more plate members crossing each other in such a manner as to be parallel to the discharge direction of the concentrated treatment liquid.

Figure 7:
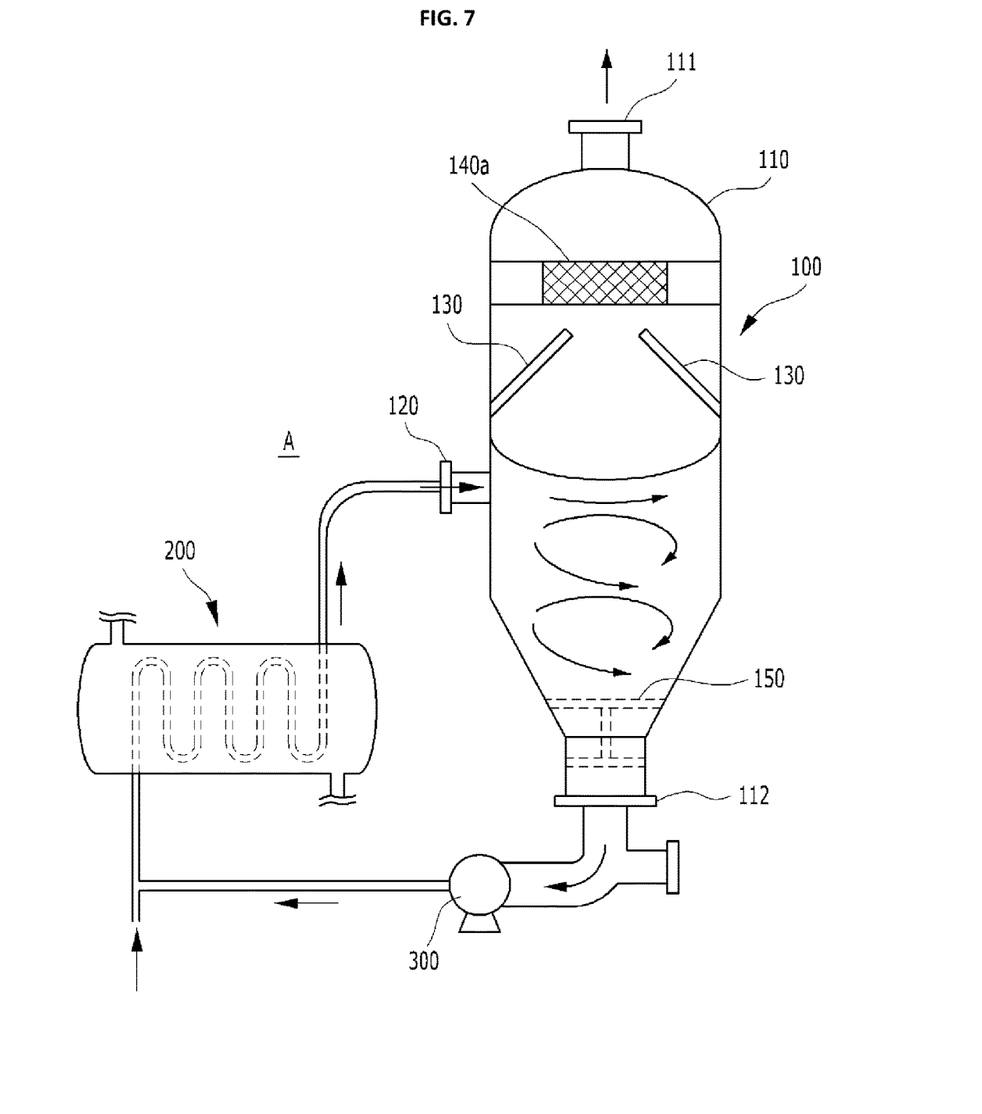
FIG. 7 is a schematic view showing a forced circulation type evaporator according to the exemplary embodiment.

On the other hand, the exemplary embodiment relates to a forced circulation type evaporator A that has the liquid-vapor separator 100 to evaporate and concentrate the treatment liquid. FIG. 7 is a schematic view showing the forced circulation type evaporator A according to the exemplary embodiment.

The forced circulation type evaporator A according to the exemplary embodiment includes a heat exchanger 200 adapted to heat the treatment liquid introduced thereinto by means of heat exchange and the liquid-vapor separator 100 adapted to separate the heated treatment liquid into vapors and concentrated treatment liquid and to discharge the vapors and the concentrated treatment liquid.

Further, the forced circulation type evaporator A according to the exemplary embodiment further includes a suction pump 300 adapted to provide power for discharging the concentrated treatment liquid from the concentrated liquid outlet 112 formed on the rear end of the liquid-vapor separator 100, and the whole or a portion of the concentrated treatment liquid discharged through the suction pump 300 is recycled to the heat exchanger 200.

As mentioned above, the liquid-vapor separator and the forced circulation type evaporator having the liquid-vapor separator according to the exemplary embodiment do not adopt the conventional spray nozzle injection system so that no foams are produced and the flashing area is provided over a given level, thereby enhancing the efficiency of evaporation, and further form the round and uniform crystals, thereby improving the efficiency in the removal of solid substances on next stage thereof.

Additionally, the liquid-vapor separator and the forced circulation type evaporator having the liquid-vapor separator according to the exemplary embodiment can enhance the efficiencies of evaporation and separation through the increment of turbulent flow strength and flashing area, thereby overcoming a scale production problem and a reference strengthening problem of water discharge, which are recently issued on the interior of the forced circulation type evaporator.

While exemplary embodiment have been described with reference to the particular illustrative embodiments, it is not to be restricted by the embodiments but only by the appended claims. It is to be appreciated that those skilled in the art can change or modify the embodiments without departing from the scope and spirit of the inventive concept as defined by the appended claims.

What is claimed is:

1. A cyclone type liquid-vapor separator for separating vapors from treatment liquid introduced thereinto, discharging the separated vapors to the upper portion thereof, and discharging concentrated treatment liquid to the lower portion thereof, the liquid-vapor separator comprising:
 a chamber comprising:
   an internal space wherein the treatment liquid introduced into the internal space is depressurized and evaporated;
   a vapor outlet formed on a top of the chamber and through which vapors generated through the evaporation is discharged; and
   a concentrated liquid outlet formed on a bottom of the chamber and through which the concentrated treatment liquid is discharged;
 an inlet part coupled to a side surface of the chamber in a direction of a tangent line of an inner peripheral surface of the chamber between the vapor outlet and the concentrated liquid outlet, the treatment liquid introduced into the chamber being turned in the form of vortexes along the inner peripheral surface of the chamber, the inlet part comprising a guide part configured to guide a rotation of the treatment liquid introduced through the inlet part, the guide part comprising a pipe passing through the inlet part; and at least one partition wall that is disposed above the tangent line of the inlet part and below the vapor outlet of the internal space of the chamber and protrudes from the inner peripheral wall of the chamber to block large mist droplets contained in the vapors from moving upward toward the vapor outlet while allowing small mist droplets to move upward together with the vapors through an opening in the at least one partition wall, wherein the pipe of the inlet part is passed through the chamber to be extendedly inserted into the chamber and includes a top portion that is open such that evaporation of the treatment liquid occurs in an extendedly inserted area of the inlet part.

2. The liquid-vapor separator according to claim 1, wherein the at least one partition wall inclinedly protrudes upwardly from the inner peripheral surface of the chamber at an angle of 90 to 180°.

3. The liquid-vapor separator according to claim 1, wherein the guide part is disposed extendedly by a section along the inner peripheral surface of the chamber from a connected portion to the side surface of the chamber.

4. The liquid-vapor separator according to claim 3, wherein the guide part is separate from the inlet part and protrudes from the inner peripheral surface of the chamber.

5. The liquid-vapor separator according to claim 1, wherein the pipe extendedly inserted into the chamber is fastened to the inner peripheral surface of the chamber along the inner peripheral surface of the chamber.

6. The liquid-vapor separator according to claim 1, further comprising an interior demister disposed above or under the at least one partition wall in the chamber and having a mesh type plate member configured to face the opening in the at least one partition wall in order to block the mist that is contained in the vapors discharged upwardly and is not removed by the at least one partition wall.

7. The liquid-vapor separator according to claim 1, further comprising an exterior demister disposed separately to an exterior of the chamber in such a manner as to be connected to an end of the vapor outlet to introduce the discharged vapors from the vapor outlet thereinto and having a chevron type member disposed in a moving path of the introduced vapors to block the mist contained in the vapors.

8. The liquid-vapor separator according to claim 1, wherein the inner peripheral wall of the chamber is tapered toward the concentrated liquid outlet formed on the bottom of the chamber to reduce a turning radius of the treatment liquid.

9. The liquid-vapor separator according to claim 8, further comprising a vortex breaking member disposed on an area wherein the concentrated liquid outlet is formed on the bottom of the chamber so as to break the vortexes generated from the treatment liquid.

10. The liquid-vapor separator according to claim 9, wherein the vortex breaking member comprises at least two plate members crossing each other in such a manner as to be parallel to a discharge direction of the concentrated treatment liquid.

11. A forced circulation type evaporator for evaporating and concentrating treatment liquid, comprising:

a heat exchanger configured to heat the treatment liquid introduced into the heat exchanger by a heat medium introduced from an exterior of the heat exchanger; and a liquid-vapor separator configured to separate vapors from the heated treatment liquid from the heat exchanger, configured to discharge the separated vapors to an upper portion of the liquid-vapor separator, and configured to discharge concentrated treatment liquid to a lower portion of the liquid-vapor separator, wherein the liquid-vapor separator comprises:

a chamber comprising:

an internal space wherein the treatment liquid introduced into the internal space is depressurized and evaporated;

a vapor outlet formed on a top of the chamber and through which vapors generated through the evaporation is discharged; and a concentrated liquid outlet formed on a bottom of the chamber and through which the concentrated treatment liquid is discharged;

an inlet part coupled to a side surface of the chamber in a direction of a tangent line of an inner peripheral surface of the chamber between the vapor outlet and the concentrated liquid outlet, the treatment liquid introduced into the chamber being turned in the form of vortexes along the inner peripheral surface of the chamber, the inlet part comprising a guide part configured to guide a rotation of the treatment liquid introduced through the inlet part, the guide part comprising a pipe passing through the inlet part; and at least one partition wall that is disposed above the tangent line of the inlet part and below the vapor outlet of the internal space of the chamber and protrudes from the inner peripheral wall of the chamber to block large mist droplets contained in the vapors from moving upward toward the vapor outlet while allowing small mist droplets to move upward together with the vapors through an opening in the at least one partition wall, wherein the pipe of the inlet part is passed through the chamber to be extendedly inserted into the chamber and includes a top portion that is open such that evaporation of the treatment liquid occurs in an extendedly inserted area of the inlet part.

12. The forced circulation type evaporator according to claim 11, further comprising a suction pump connected to a rear end of the liquid-vapor separator and configured to provide power for discharging the concentrated treatment liquid from the liquid-vapor separator.

13. The forced circulation type evaporator according to claim 11, wherein the at least one partition wall inclinedly protrudes upwardly from the inner peripheral surface of the chamber at an angle of 90 to 180°.

14. The forced circulation type evaporator according to claim 11, wherein the guide part is disposed extendedly by a section along the inner peripheral surface of the chamber from a connected portion to the side surface of the chamber.

15. The forced circulation type evaporator according to claim 14, wherein the guide part is separate from the inlet part and protrudes from the inner peripheral surface of the chamber.

16. The forced circulation type evaporator according to claim 11, wherein the pipe extendedly inserted into the chamber is fastened to the inner peripheral surface of the chamber along the inner peripheral surface of the chamber.

17. The forced circulation type evaporator according to claim 11, further comprising an interior demister disposed above or under the at least one partition wall in the chamber and having a mesh type plate member configured to face the opening in the at least one partition wall in order to block the mist that is contained in the vapors discharged upwardly and is not removed by the at least one partition wall.

18. The forced circulation type evaporator according to claim 11, further comprising an exterior demister disposed separately to an exterior of the chamber in such a manner as to be connected to an end of the vapor outlet to introduce the discharged vapors from the vapor outlet thereinto and having a chevron type member disposed in a moving path of the introduced vapors to block the mist contained in the vapors.

* * * * *